(12) United States Patent
Yepez

(10) Patent No.: US 9,789,977 B2
(45) Date of Patent: Oct. 17, 2017

(54) SECURITY KIOSK

(75) Inventor: Rafael Yepez, Duluth, GA (US)

(73) Assignee: NCR CORPORATION, Duluth, GA (US)

( * ) Notice: Subject to any disclaimer, the term of this patent is extended or adjusted under 35 U.S.C. 154(b) by 278 days.

(21) Appl. No.: 13/194,149

(22) Filed: Jul. 29, 2011

(65) Prior Publication Data

US 2013/0027187 A1 Jan. 31, 2013

(51) Int. Cl.
*H04Q 5/22* (2006.01)
*B64F 1/36* (2017.01)
*G06Q 50/26* (2012.01)
*G07C 9/00* (2006.01)

(52) U.S. Cl.
CPC ............ *B64F 1/366* (2013.01); *G06Q 50/265* (2013.01); *G07C 9/00103* (2013.01)

(58) Field of Classification Search
CPC ....... G08B 19/00; B64F 1/366; G06Q 50/265; G07C 9/0013
USPC ..... 340/10.1, 5.2, 235, 517, 521, 501, 573.1
See application file for complete search history.

(56) References Cited

U.S. PATENT DOCUMENTS

| | | | | |
|---|---|---|---|---|
| 4,984,156 A * | 1/1991 | Mekata | ................... | B64F 1/366 156/350 |
| 6,119,096 A * | 9/2000 | Mann | ...................... | E05G 5/003 235/384 |
| 7,061,383 B2 * | 6/2006 | Davis | ...................... | G07B 15/00 340/5.81 |
| 7,629,885 B2 * | 12/2009 | Dugan | ..................... | G01N 1/02 340/5.3 |
| 7,889,113 B2 * | 2/2011 | Cardiasmenos | .... | G01N 21/3581 342/175 |
| 2001/0016825 A1 * | 8/2001 | Pugliese, III | .......... | G06Q 10/02 705/5 |
| 2001/0049926 A1 * | 12/2001 | Davies | ...................... | B08B 5/02 55/385.2 |
| 2004/0222790 A1 * | 11/2004 | Karmi et al. | ................. | 324/300 |
| 2004/0232054 A1 * | 11/2004 | Brown | ................. | G01V 5/0008 209/552 |
| 2004/0240711 A1 * | 12/2004 | Hamza | ............... | G06K 9/00201 382/118 |
| 2004/0252024 A1 * | 12/2004 | Huey | ..................... | G01V 11/00 340/540 |
| 2004/0262383 A1 * | 12/2004 | Zielinski | ............ | G07C 9/00126 235/382 |
| 2005/0057354 A1 * | 3/2005 | Jenkins | .................. | G01V 11/00 340/522 |
| 2005/0251430 A1 * | 11/2005 | Jindel | .................... | G06Q 10/02 705/5 |

(Continued)

*Primary Examiner* — Zhen Y Wu

(74) *Attorney, Agent, or Firm* — Paul W. Martin; Schwegman Lundberg & Woessner, PA

(57) ABSTRACT

A security kiosk which allows travelers to process themselves through a security checkpoint. An example security kiosk includes an identification device, communications circuitry, a security scanner for examining a traveler and items accompanying the traveler, and a processor for obtaining identification information from the traveler using the identification device, for connecting to a host computer system using the communications circuitry, for determining whether the traveler has previously checked in from the host computer system, for checking in the traveler when the traveler has not previously checked in, for reading a check-in document when the traveler has previously checked in, and for operating the security scanner.

15 Claims, 4 Drawing Sheets

(56) References Cited

U.S. PATENT DOCUMENTS

| | | | |
|---|---|---|---|
| 2006/0017605 A1* | 1/2006 | Lovberg | G01K 7/226 342/22 |
| 2006/0081704 A1* | 4/2006 | Boyd | G06Q 10/02 235/382 |
| 2006/0202035 A1* | 9/2006 | Challa et al. | 235/462.01 |
| 2007/0211922 A1* | 9/2007 | Crowley | B64F 1/366 382/115 |
| 2007/0222620 A1* | 9/2007 | Trammell, III | G01V 11/00 340/573.1 |
| 2008/0012699 A1* | 1/2008 | Crowley | G01T 1/167 340/521 |
| 2008/0104174 A1* | 5/2008 | Deaven | A61B 6/00 709/205 |
| 2008/0302870 A1* | 12/2008 | Berini | G07C 9/00087 235/380 |
| 2009/0208067 A1* | 8/2009 | Peng | B66B 5/0012 382/115 |
| 2009/0218177 A1* | 9/2009 | Tyni | B66B 1/3476 187/392 |
| 2009/0322866 A1* | 12/2009 | Stotz et al. | 348/77 |
| 2010/0051679 A1* | 3/2010 | Molloy | G06Q 10/10 235/375 |
| 2010/0085564 A1* | 4/2010 | Guo | G01J 3/02 356/301 |
| 2010/0123004 A1* | 5/2010 | Felkel | G07C 9/02 235/382 |
| 2010/0123571 A1* | 5/2010 | Crowley | G01V 11/00 340/521 |
| 2010/0158191 A1* | 6/2010 | Gray | G01V 5/0008 378/57 |
| 2010/0161241 A1* | 6/2010 | Manneschi | G07C 9/00158 702/22 |
| 2012/0103060 A1* | 5/2012 | Brasfield | G01N 33/0004 73/23.34 |
| 2012/0131985 A1* | 5/2012 | Brasfield | G01N 33/0057 73/23.34 |
| 2012/0151993 A1* | 6/2012 | Brasfield | G01N 33/0057 73/23.34 |
| 2013/0027187 A1 | 1/2013 | Yepez | |

* cited by examiner

SECURITY KIOSK

BACKGROUND

Current traveler flow through airports includes security, including scanning of baggage at a baggage scanning station, scanning of carry-on baggage at another baggage scanning station, and scanning of travelers themselves through yet another scanning station.

A traveler must also acquire a boarding pass prior to reaching any of the security stations. Travelers must present a boarding pass to a security agent who examines the boarding passes and some form of identification provided by the travelers during an initial security check.

Travelers may print boarding passes during a remote check-in process, for example, using home computers connected via the Internet to airline web sites, perform an airport check-in process resulting in printing of a boarding pass from a self-check-in terminal or assisted check-in terminal, or download an electronic boarding pass to a smart phone or other portable electronic device.

Current airport check-in and security processes are inefficient. They are fragmented and could benefit from streamlining. Therefore, it would be desirable to provide a security kiosk that integrates check-in with security scanning.

SUMMARY

A security kiosk is provided.

An example security kiosk includes an identification device, communications circuitry, a security scanner for examining a traveler and items accompanying the traveler, and a processor for obtaining identification information from the traveler using the identification device, for connecting to a host computer system using the communications circuitry, for determining whether the traveler has previously checked in from the host computer system, for checking in the traveler when the traveler has not previously checked in, for reading a check-in document when the traveler has previously checked in, and for operating the security scanner.

The example security kiosk may further include an enclosure through which the traveler must pass during a security check. The scanner operates while the traveler is within the enclosure. The enclosure may include entrance and exit doors controlled by the processor to control traveler movement in and out of the enclosure.

The example kiosk may further be monitored by security personnel. The example kiosk may include an auxiliary display for use by the security personnel. The example kiosk may be coupled to a security terminal operated by the security personnel.

DETAILED DESCRIPTION

Figure 1:
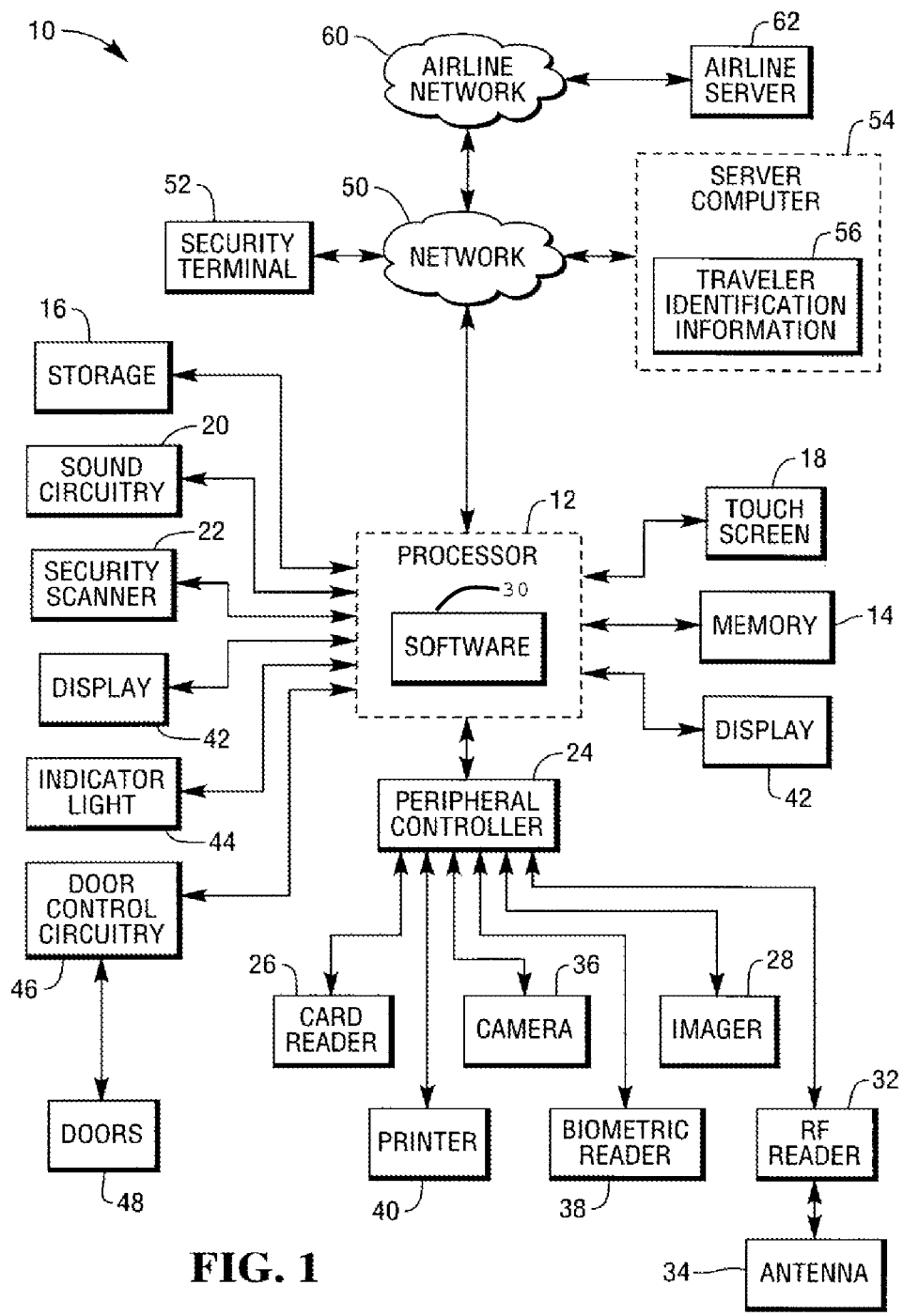
FIG. 1 is a block diagram of an example security kiosk.

With reference to FIG. 1, example security kiosk 10 includes processor 12, memory 14, storage 16, touch screen 18, and security scanner 22. Example security kiosk 10 is in an airport environment, but may be applied to other environments. Security kiosk 10 may be located at a security checkpoint separating travelers from arrival and departure points, e.g., airport arrival and departure gates.

Processor 12 executes software 30 for displaying instructions, issuing prompts, and receiving inputs from travelers through touch screen 18. Processor 12 loads software 30 from storage 16 into memory 14 during execution.

Software 30 completes an airport check-in process which includes identifying a traveler and scanning the traveler and the traveler's baggage and/or other belongings. If the traveler's travel requires reading a passport, the check-in process includes reading the traveler's passport. If the traveler requires a boarding pass, the check-in process prints a boarding pass. Otherwise, the check-in process reads a customer provided boarding pass, either a printed copy of a boarding pass or a displayed copy of a boarding pass on a smart phone or other portable electronic device. Software 30 may additionally read an airline-provided near field communications (NFC) tag using radio frequency (RF) reader 32 to validate the traveler.

During the check-in process, software 30 communicates with individual airline servers 62 through network 50. Software 30 is compliant with the Common Use Self-Service (CUSS) standard, which specifies how multiple airlines may provide traveler services at a shared self-service kiosk. In order to provide traveler services, such as check-in functionality, the CUSS standard requires a network infrastructure that uses private Internet protocol [IP] networks to each airline's internal network 60.

Software 30 also communicates with airport security terminal 52 operated by security personnel. Software 30 sends alert messages to airport security terminal 52 and airport security terminal 52 monitors events at security kiosk 10 and responds to the alerts. For example, software 30 may communicate images from security scanner 22 in real-time to security terminal 52. Software 30 may respond to commands from security terminal 52, such as commands to door control circuitry 46 to open and/or close kiosk entrance and exit doors 48.

Security kiosk 10 may further include an external display 42 for use by security personnel, for example, on an exit side. Software 30 may display information including the results from scanner 22. Display 42 may include a touch screen. Software 30 may accept inputs from the security personnel.

Security scanner 22 scans a traveler, including items on the traveler, items carried by the traveler, or items pushed or pulled by the traveler. For example, in an airport environment, software 30 may open an entrance door to allow a traveler to enter security scanner 22, scan the traveler and any carry-on belongings of the traveler, and then open an exit door to allow the traveler to exit security scanner 22. Security scanner 22 may include an X-ray or other suitable scanner that identifies contraband items, such as weapons, which are not permitted to be carried by travelers beyond the security checkpoint. Security scanner 22 may additionally include an explosives sniffing device.

Security kiosk 10 may additionally include sound circuitry 20 for providing aural feedback to a traveler during use of security kiosk 10 and its peripherals. Software 30 may play pre-recorded messages to instruct a traveler, for example, when software 30 detects a security violation. Software 30 may further generate alarm tones. Sound circuitry 20 may include a tone generator and speakers.

Alternatively, sound circuitry 20 may include an intercom system for facilitating communication between security personnel and a traveler.

Security kiosk 10 may additionally include indicator light 44 for providing visual feedback to a traveler during use of security kiosk 10. Indicator light 44 may include one or more lights. Software 30 may activate indicator light 44 with sound from sound circuitry 20.

Software 30 also controls a number of peripheral modules through one or more peripheral controllers 19. Peripheral controller 24 may include a serial controller, such as an RS232 or Universal Serial Bus (USB) controller.

Security kiosk 10 includes peripherals related to its purpose. For example, in an airport environment, security kiosk 10 may include card reader 26, imager 28, RF reader 32, camera 36, biometric reader 38, and printer 40.

Card reader 26 reads cards such as payment cards, loyalty cards, and other identity cards under the control of software 30. Card reader 26 may include any of the known types of magnetic card readers, including a manual drag-through slot card reader, a motorized card reader, or an insertion type push-pull card reader. Software 30 may perform tests on to determine the authenticity and status of payment cards, loyalty cards, and other identity cards.

Imager 28 captures images from passports, including full page images and/or images machine readable zones on passports under the control of software 30. Software 30 obtains information from the image via optical character recognition. Software 30 may perform tests to determine the authenticity and status of passports.

Imager 28 may also read barcodes on traveler provided documents or displayed by traveler provided portable electronic devices, such as smart phones, personal digital assistants, and hand-held computers. For example, imager 28 may read barcode labels on receipts, driver's licenses, and boarding passes under the control of software 30.

RF reader 32 interrogates and reads data from RF chips in passports through antenna 34 and under the control of software 30. RF reader 32 may also be used to read contactless payment or identity cards.

Camera 36 captures images of travelers. These images may be used by software 30 for security, video logging, and facial recognition.

Biometric reader 38 may include a fingerprint reader, iris scanner, or palm reader.

In order to perform security checks, travelers may be required to provide authenticating information in advance. For example, travelers may be required to provide biometric samples, such as fingerprint, iris, palm, and/or facial images prior to traveling. Such reference traveler identification information 56 may be stored by server computer 54.

Software 30 may not allow a traveler to enter security scanner 22 by not opening the entrance door if software 30 determines that one or more pieces of traveler provided information result in alerts to security terminal 52.

Printer 40 prints documents such as receipts, boarding passes, and travel agendas under the control of software 30.

Figure 2:
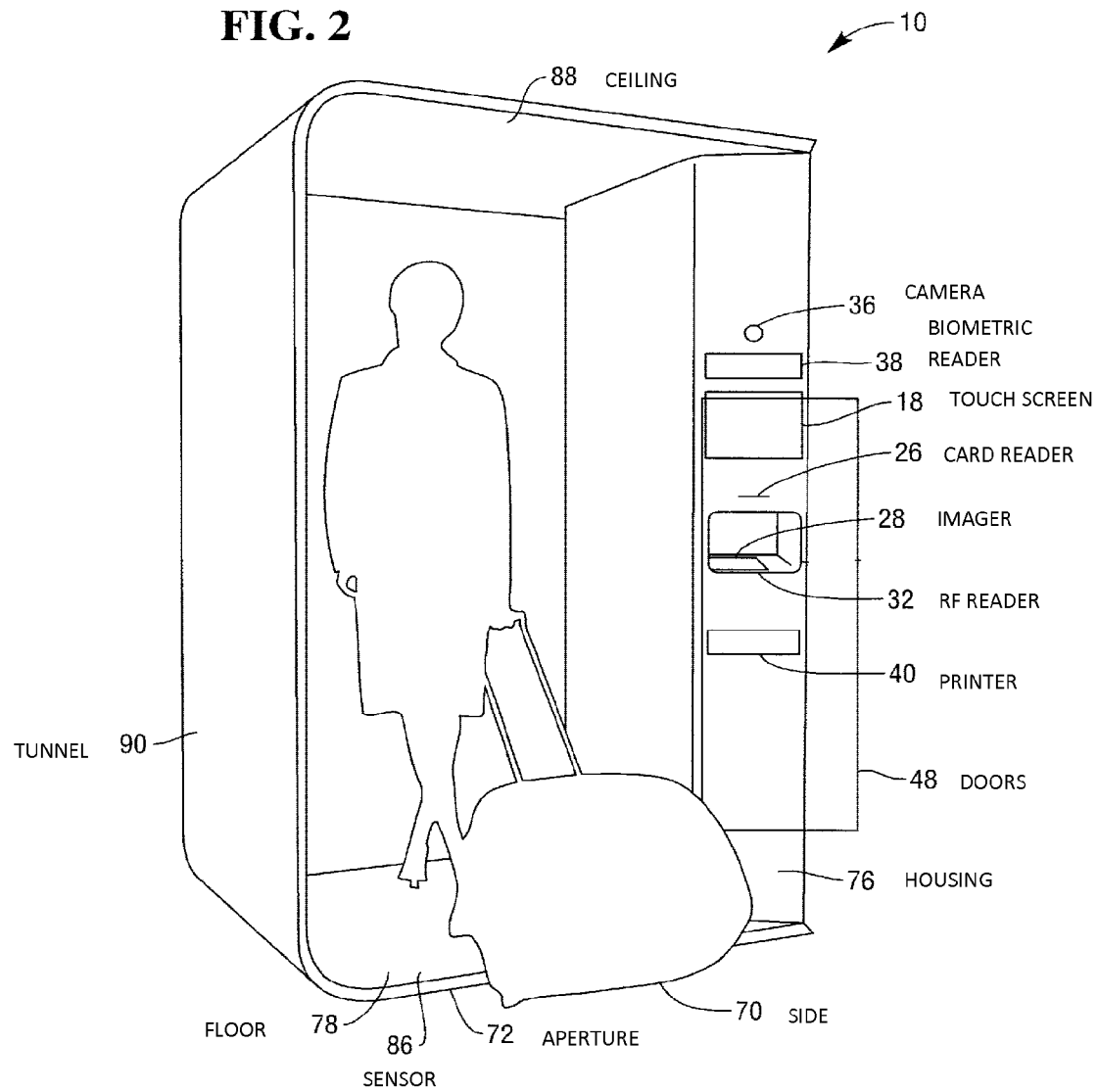
FIG. 2 is a first perspective view of the example security kiosk showing an entrance side.
Figure 3:
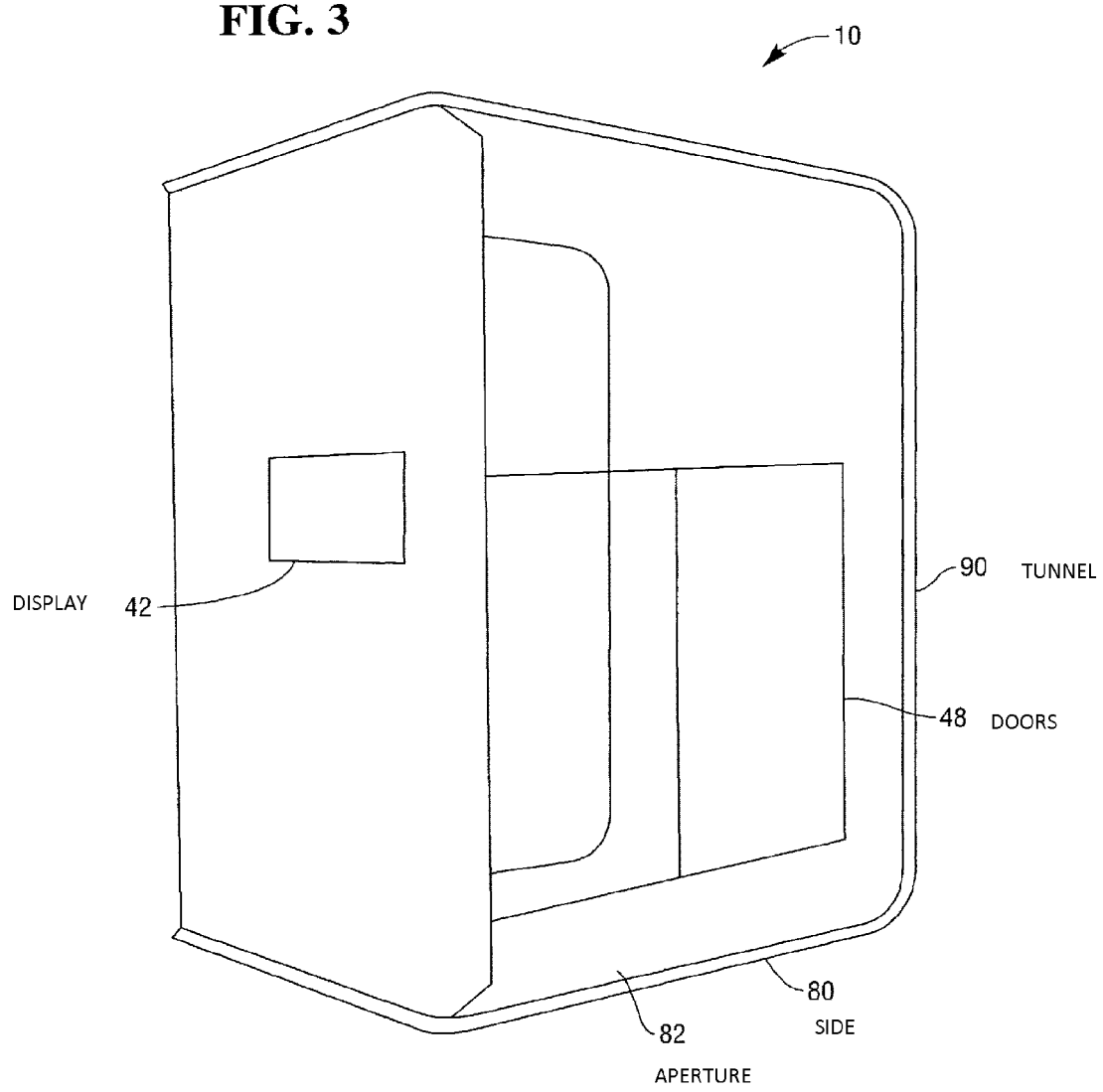
FIG. 3 is a perspective view of the example security kiosk showing an exit side.

Turning now to FIGS. 2 and 3, an example security kiosk 10 is illustrated in further detail.

Security kiosk includes an entrance side 70 and an exit side 80. Departing travelers awaiting security clearance are located on the entrance side 70. Travelers who have not checked in may check-in at security kiosk 10. Travelers who have checked in, successfully passed by security scanner 22 are located on the exit side 80 and, if no further security checks are required, such travelers may move on to their departure points.

Entrance side 70 includes an entrance aperture 72. To one side of entrance aperture 72 is housing 76 containing security kiosk components from FIG. 1. Travelers may check-in and initiate security clearance using these components.

Exit side 80 includes an exit aperture 82. Entrance and exit apertures 72 and 82 are defined by enclosure 90, which forms a security tunnel for limiting traveler access from one area to another.

Entrance and exit apertures 72 and 82 are defined by enclosure 90, which forms a security tunnel for limiting traveler access from one area to another. Security kiosk 10 also includes floor 78 and ceiling 88. Floor 78 may be stationary or may include a motorized platform or belt that moves a traveler from entrance 70 to exit 80.

For example, a traveler may operate security kiosk 10 to print a boarding pass using printer 40 following successful identification. Identification may include operating security kiosk 10 to read any of an identity card using card reader 26, a passport using imager 28 and RF reader 32, and a biometric using any of camera 36 and biometric reader 38.

As another example, a traveler may operate security kiosk 10 to read a barcode on a boarding pass using imager 28. The boarding pass may have been printed by the traveler in advance from another computer, such as a home computer, or may have been downloaded to a mobile communication device and displayed during imaging. The traveler may be required to provide additional identification by operating security kiosk 10 to read any of an identity card using card reader 26, a passport using imager 28 and RF reader 32, and a biometric using any of camera 36 and biometric reader 38.

In either case, software 30 may operate security scanner 22 following successful identification and check-in or successful identification and reading of a boarding pass. A traveler walks through security scanner 22.

Software 30 may operate security scanner 22 for a predetermined period of time the substantially corresponds to the traveler walking through. Alternatively, security scanner 22 may also include a sensor 86, for example a weight sensor in floor 78. Software 30 operates security scanner 22 in response to receiving a signal from the sensor 86 indicative of a person being within security tunnel 90 and adjacent security scanner 22.

Security kiosk 10 may include an entrance door covering entrance aperture 72 and an exit door covering exit aperture 82. The traveler may open and close the entrance and exit doors 48. Alternatively, software 30 may open and close the entrance door to allow the traveler to enter security scanner 22 following successful identification and check-in or successful identification and reading of a boarding pass. Software 30 may open and close the exit door following successful scanning or keep the exit door closed if scanning is not successful. Entrance and exit doors may also serve to contain emissions from security scanner 22 if harmful.

A security guard may be located at the exit 80 to control traveler passage out of security kiosk 10. The security guard may use optional display 42.

Figure 4:
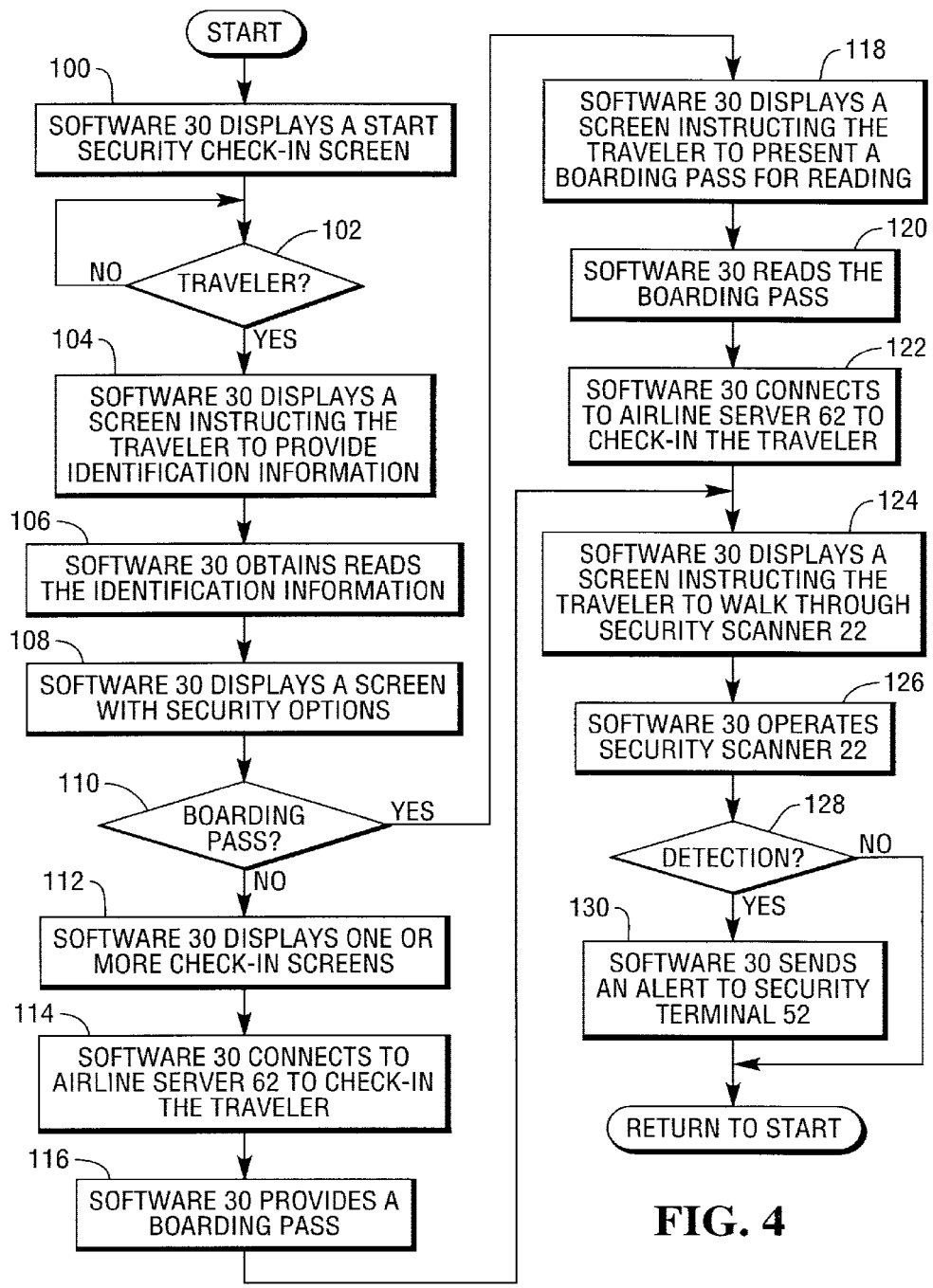
FIG. 4 is a flow diagram illustrating operation of the example security kiosk.

With respect to FIG. 4, a method of operating security kiosk 10 is illustrated.

In step 100, software 30 displays a start security check-in screen. The start security screen may include a "touch here" button that when touched begins a security check-in process.

In step 102, software 30 waits for a traveler to begin a security check-in process. If a traveler begins a security check-in process, operation proceeds to step 104.

In step 104, software 30 displays a screen instructing the traveler to provide identification information.

In step 106, software 30 obtains the identification information. Software 30 may capture identification information from one or more of card reader 26, imager 28, radio frequency (RF) reader 32, camera 36, and biometric reader 38.

For example, a traveler may insert an identification card, such as a credit card, into card reader 26. As another example, a traveler may place a driver's license or passport in the field of view of imager 28 to read a barcode or other information. As another example, a traveler may provide biometric information, such as a fingerprint, palm information, or iris information using biometric reader 38.

In step 108, software 30 displays a screen with security options, including selections for travelers with and without boarding passes.

In step 110, software 30 receives an indication from the traveler as to whether the traveler has previously checked-in and obtained a boarding pass. If the traveler has previously checked in, operation proceeds to step 118. Otherwise, operation proceeds to step 112.

In step 112, software 30 displays one or more check-in screens, such as seat selection, carry-on baggage, other baggage, upgrade, and special service selections. Individual airports may restrict use of security kiosk 10 to only travelers with carry-on baggage or make other arrangements to process checked baggage.

In step 114, software 30 connects to airline server 62 to check-in the traveler.

In step 116, software 30 provides a boarding pass. For example, software 30 may print a boarding pass using printer 40. Software 30 may also print schedules and/or receipts as requested by the traveler. Operation proceeds to step 124.

From step 110, software 30 displays a screen instructing the traveler to present a boarding pass for reading in step 118. Software 30 may additionally include an option instructing the traveler to provide an airline-provided NFC tag.

In step 120, software 30 reads the boarding pass using imager 28. Software 30 reads an NFC tag, if presented by the traveler, using RF reader 32.

In step 122, software 30 connects to airline server 62 to check-in the traveler.

From step 116 and step 122, software 30 displays a screen instructing the traveler to walk through security scanner 22 in step 124. If security kiosk 10 includes an entrance door, software 30 may operate the entrance door to open to allow the traveler to enter. Following receipt of a kiosk full signal from sensor 86 and/or a predetermined delay period, software 30 may operate the entrance door to close.

Software 30 may provide aural instructions, warnings, and other messages through sound circuitry 22, and additionally provide visual indications through indicator light 44.

In step 126, software 30 operates security scanner 22.

In step 128, software 30 determines whether security scanner 22 has detected a security threat. If so, operation continues to step 130. Otherwise operation skips to the next step.

In step 130, software 30 sends an alert to security terminal 52. Security personnel investigate and control further use of security kiosk 10 until the traveler is cleared or detained.

If security kiosk 10 includes an exit door, software 30 may retain the exit door in a closed position until opened by a security guard at security terminal 52.

If security scanner 22 fails to detect a security threat, operation returns to step 100 to wait for another traveler. If security kiosk 10 includes an exit door, software 30 may operate the exit door to open to allow the traveler to exit. Following receipt of a kiosk empty signal from sensor 86 and/or a predetermined delay period, software 30 may operate the exit door to close.

Although particular reference has been made to certain embodiments, variations and modifications are also envisioned within the spirit and scope of the following claims.

What is claimed is:

1. A security kiosk comprising:
an identification device;
communications circuitry;
a security scanner for examining a traveler and items carried with the traveler including carry-on baggage as the traveler walks through the security scanner, wherein the security scanner includes an entrance door that is opened by a processor on successful authentication of the traveler and the entrance door is closed after receiving a signal indicative of the traveler being within a security tunnel of the security kiosk and adjacent to the security scanner from a sensor and a predetermined delay period of time and an exit door that is opened by the processor on successful scanning of the traveler and the exit door remains closed when scanning is unsuccessful, the entrance door and exit door contain emissions from the security scanner while scanning the traveler when the emissions are harmful, and wherein the security scanner includes an intercom system for facilitating communication between a security person and the traveler, wherein each door is elevated at that door's bottom above a bottom surface of the security scanner to a height of a touch screen elevated from the bottom and affixed on an interface wall;
the processor for obtaining identification information from the traveler using the identification device, for connecting to a host computer system using the communications circuitry, for determining whether the traveler has previously checked in from the host computer system, for checking in the traveler when the traveler has not previously checked in, for reading a check-in document when the traveler has previously checked in, and for operating the security scanner, and wherein the security kiosk is operated by the traveler.

2. The kiosk of claim 1, wherein the identification device comprises a card reader for reading an identity card of the traveler.

3. The kiosk of claim 1, wherein the identification cation device comprises an imager for reading an identity card of the traveler.

4. The kiosk of claim 1, wherein the identification device comprises an imager for reading a passport of the traveler.

5. The kiosk of claim 1, wherein the identification device comprises a biometric device for capturing biometric information from the traveler.

6. The kiosk of claim 1, wherein the identification device comprises a radio frequency device reader for reading a radio frequency device of the traveler.

7. The kiosk of claim 1, wherein the identification device comprises a camera for capturing facial information from a traveler.

8. The kiosk of claim 1, wherein the processor is coupled to a security terminal through the communications circuitry, and wherein the processor is also for sending information to the security terminal for monitoring by the security personnel.

9. The kiosk of claim 1, further comprising:
a display for displaying instructions to the traveler; and
an input device for receiving inputs from traveler.

10. The kiosk of claim 1, further comprising:
an auxiliary display for displaying information to the security personnel display.

11. The kiosk of claim 1, further comprising:
an indicator light for providing an indication to the traveler, wherein the processor is also for controlling the indicator light.

12. The kiosk of claim 1, further comprising:
sound circuitry for providing an indication to the traveler, wherein the processor is also for controlling the sound circuitry.

13. A security kiosk comprising:
an enclosure including an interface wall, an entrance aperture, and an exit aperture;
a touch screen on the interface wall;
an identification device on the interface wall;
communications circuitry;
a security scanner for examining a traveler and items carried with the traveler including carry-on baggage when the traveler is within the enclosure as the traveler walks through the security scanner and wherein the enclosure includes an entrance door that is opened by a processor on successful authentication of the traveler and the entrance door is closed after receiving a signal indicative of the traveler being within a security tunnel of the kiosk and adjacent to the security scanner from a sensor and a predetermined delay period of time and an exit door that is opened by the processor on successful scanning of the traveler and the exit door is kept closed when scanning is unsuccessful, and the entrance door and exit door contain emissions from the security scanner while scanning the traveler when the emissions are harmful and wherein the security scanner includes an intercom system for facilitating communication between a security person and the traveler, and wherein each door is elevated at that door's bottom above a bottom surface of the security scanner to a height of the touch screen elevated from the bottom and affixed on the interface wall;
the processor for displaying instructions and receiving inputs from the traveler using the touch screen, for obtaining identification information from the traveler using the identification device, for connecting to a host computer system using the communications circuitry, for determining whether the traveler has previously checked in from the host computer system, for checking in the traveler when the traveler has not previously checked in, for reading a check-in document when the traveler has previously checked in, for instructing the traveler to enter the enclosure, and for operating the security scanner when the traveler is within the enclosure, and wherein the security kiosk is operated by the traveler.

14. A security method comprising:
obtaining identification information from a traveler by a kiosk, wherein obtaining further include operating the kiosk by the traveler;
connecting to a host computer system by the kiosk;
determining whether the traveler has previously checked in from the host computer system by the kiosk;
checking in the traveler when the traveler has not previously checked in by the kiosk;
reading a check-in document when the traveler has previously checked in by the kiosk;
and
opening an entrance door by a processor to have access to the security scanner upon successful authentication of the traveler and operating a security scanner to scan the traveler and items carried with the traveler including carry-on baggage by the kiosk as the traveler walks through the security scanner communicating by security personnel and the traveler through an intercom system integrated into the security scanner when the traveler walks through the security scanner, closing the entrance door after receiving a signal indicative of the traveler being within a security tunnel of the kiosk and adjacent to the security scanner from a sensor and after a predetermined delay period, and opening by the processor exit doors for the traveler to exit the security scanner upon successful scanning of the traveler and keeping the exit doors closed when scanning is unsuccessful, and maintaining the doors in a closed position to retain emissions from the security scanner during the scanning of the traveler when the emissions are harmful, and wherein each door is elevated at that door's bottom above a bottom surface of the security scanner to a height of a touch screen elevated from the bottom and affixed on an interface wall of the security scanner.

15. The method of claim 14, further comprising:
providing indications to the traveler by the kiosk, the indications including when to enter and when to leave an enclosure scanned by the security scanner.

* * * * *